Feb. 24, 1942.                A. M. YOUNG                2,273,917
AUTOMATIC TOASTER
Filed Aug. 3, 1940            2 Sheets-Sheet 1
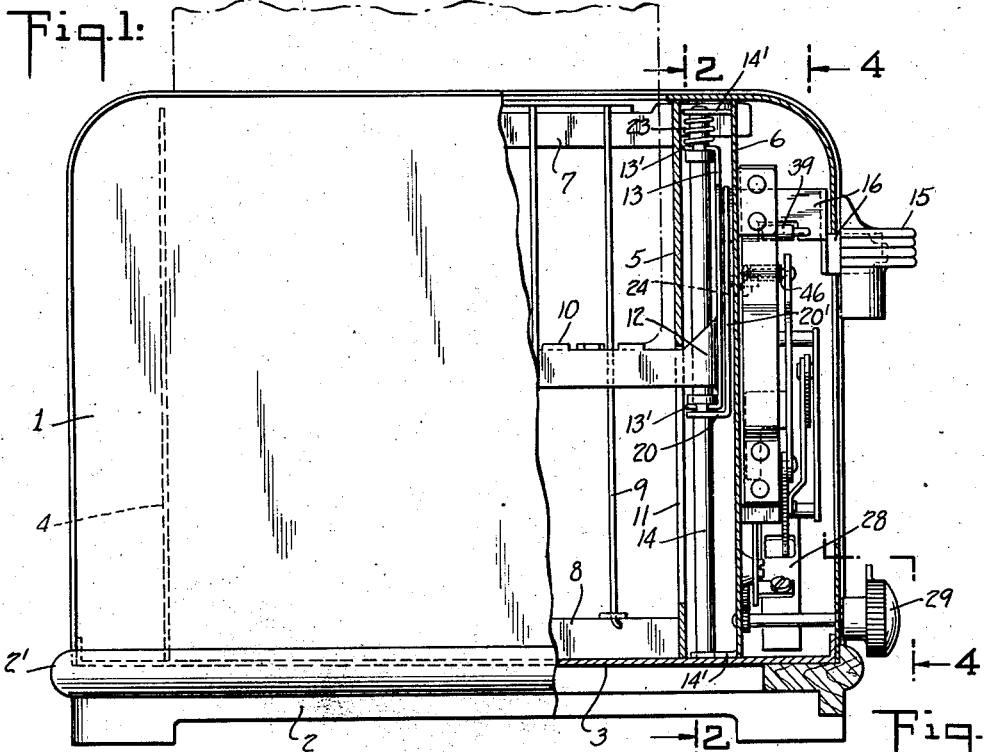
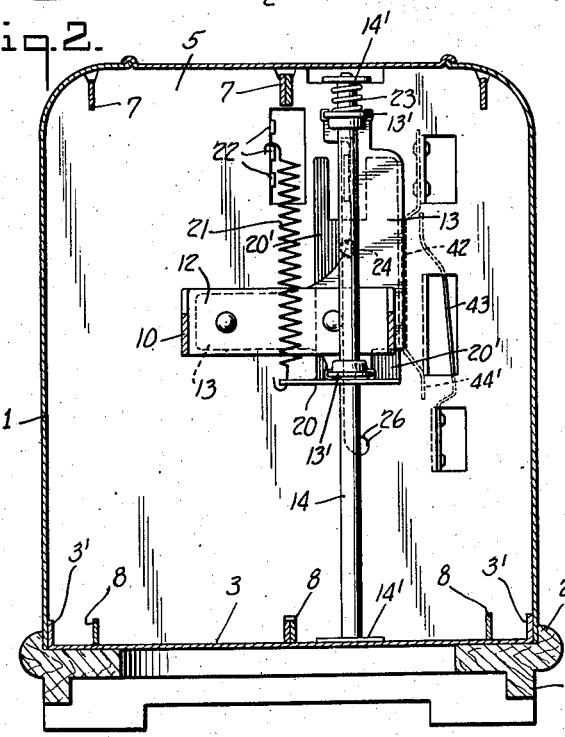
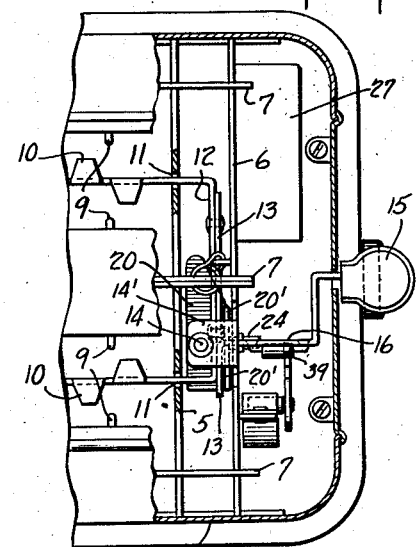
INVENTOR
ALLAN M. YOUNG
BY
ATTORNEYS Feb. 24, 1942.  A. M. YOUNG  2,273,917
AUTOMATIC TOASTER
Filed Aug. 3, 1940   2 Sheets-Sheet 2

INVENTOR
ALLAN M. YOUNG
BY
ATTORNEYS

Patented Feb. 24, 1942

2,273,917

UNITED STATES PATENT OFFICE 2,273,917

AUTOMATIC TOASTER

Allan M. Young, Meriden, Conn., assignor, by mesne assignments, to Manning, Bowman & Co., Meriden, Conn., a corporation of Delaware Application August 3, 1940, Serial No. 350,252

6 Claims. (Cl. 161—16)

This invention relates to automatic electric toasters and the like and more particularly to the type of automatic toaster set forth in my Patent 2,176,940, issued October 24, 1939.

One object of the invention is a toaster of the above indicated character embodying novel means for permitting the setting of the toaster for toasting operation a predetermined time and at the same time permitting the elevation of the toast for inspection without interfering with or resetting the timing mechanism.

Further objects of the invention will hereinafter appear.

For a better understanding of the invention reference may be had to the accompanying drawings forming a part of this application wherein—

Fig. 1 is a side view partly in section of a toaster embodying the invention;

Fig. 2 is a sectional view along the line 2—2 of Fig. 1;

Fig. 3 is a plan view partly in section;

Figure 4:
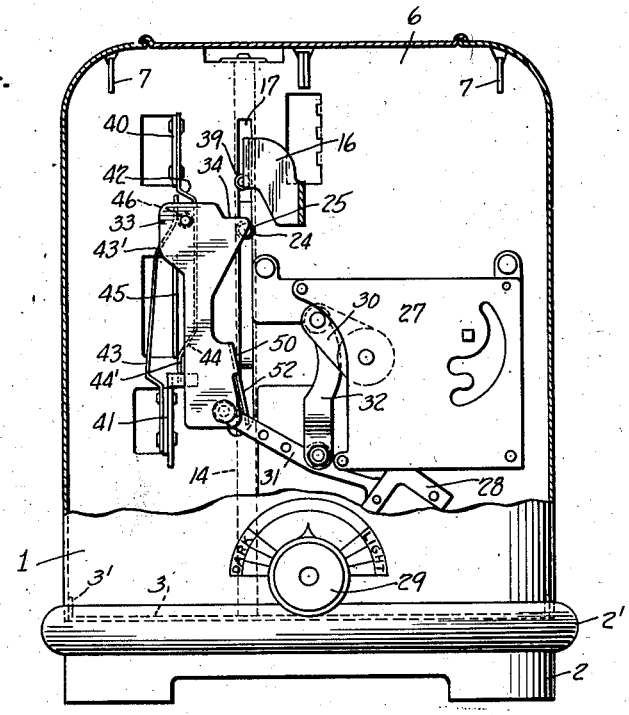
Fig. 4 is an end view partly in section along the line 4—4 of Fig. 1.

Referring to the drawings the invention is illustrated as embodied in a toaster having a casing 1 which is generally of rectangular shape in plan, side and end views with a base support 2 therefor of suitable material, as for example wood, but it is understood that the invention is applicable to other types and designs of casings and supports therefor. The toaster frame of the embodiment shown comprises a base plate 3 having an upstanding flange 3' formed around the edge thereof and the lower edge of the casing 1 surrounds the flange 3' and is disposed between the flange 3' and the border 2' of the base. The toaster frame also comprises a back vertical end plate 4 and a pair of front spaced vertical plates 5 and 6, these plates being fastened to each other in any suitable manner, as, for example, by being anchored to the base plate 3 in any conventional manner. The electrical heating elements (omitted for convenience in illustration) are carried by upper and lower elements 7 and 8 which bridge the plates 4, 5 and 6, there being three heating elements one for each of the pairs of bridging elements 7 and 8. These bridging elements 7 and 8 also carry vertically disposed wires 9 which form vertically disposed chambers for the reception of the slices of toast and form spacing and centering means for retaining the toast in spaced heating relation to the electric heaters. All of the parts 1 and 3 to 8 may be made of sheet metal or other suitable material.

In each of the toasting chambers is disposed a rack 10 which during the toasting operation is disposed at the bottom of the toast chamber but may be elevated for toast inspection. These racks 10 are formed from a U-shaped member 12 with the legs which form the racks 10 passing through vertical guide slots 11 formed in the end plate 5. This U member 12 is fastened to a vertical guide piece 13, having its upper and lower ends turned at right angles to form the parts 13' and these parts 13' are perforated to receive the guide post 14, the latter thus guiding the member 13 up and down. To the guide member 13 is fastened a starting and toast inspecting member 15 and in the particular embodiment shown this member 15 is carried by an angle piece 16 formed integrally with the guide member 13, this angle piece 16 passing through a vertical guide slot 17 formed in the end frame plate member 6. The vertical guide post 14 may be secured in any suitable manner, as, for example, by means of the ears 14' formed on the upper and lower edges of the end plates 6.

The toaster embodies an elevator or ejector 20 threaded over the guide post 14 and disposed underneath the lower part 13' of the rack guide 13. This elevator 20 is provided with a vertical guide plate 20' sliding between the guide member 13 and the end plate 6, and an elevating or ejecting spring 21 is fastened at its lower end to the elevator 20 and at its upper end to either of the fastening lugs 22 formed from the end plate 6. A bumper spring 23 is disposed around the upper end of the guide posts and between the upper part 13' and the upper fastening part or ear 14'. Fastened to the elevator guide plate 20' is a pin 24 which projects through the guide slots 17 in end plate 6 and this pin 24 is provided with a roller 25 thereon. The bottom of the slot 17 is formed into a curve with the upper surface 26 thereof forming a shoulder for retaining the pin 24 in its lowermost position in the slot 17 until it is kicked out by the timing mechanism, as hereinafter described.

The timing mechanism is indicated generally at 27 and the automatic switch is indicated generally at 28. At 29 is indicated generally the conventional means for setting the timing mechanism for light or dark toast. At 30 and 31 are indicated the lever members connected by a linkage 32 for setting the timing mechanism and closing the switch, that is, by actuating the lever 31 the timer and the switch may be set in the usual conventional manner. To the outer end of the lever 31 is pivotally fastened a setting member or pawl 33 which, in the particular embodiment shown, extends generally in an upward direction and has at its upper end a pawl tooth or lug 34 which, with the mechanism in the off position, is disposed underneath and in the path of a roller 39 carried by the angle member 16, the latter carrying the manually operated member 15. A pair of lugs 40 and 41 are struck up from the plate 6 and these lugs carry leaf springs 42 and 43 fastened respectively thereto, the spring 42 extending downwardly with a part thereof being disposed parallel with the guiding slot 17 in the plate member 6. The lower end of this spring 42 is formed into a bent portion 44 which engages or is closely disposed to a gate 45. The gate 45 is struck up from the plate member 6 at right angles thereto and the extreme lower end of the spring 42 is formed into a vertical part 44'. The upper end of the spring 43 is also formed into the bent portion 43', the bend being towards the right as shown in Fig. 4. The pawl 33 carries at its free end a roller 46, this roller in the off position of the timer and switch mechanism being disposed between the upper free end of the spring 43 and the spring 42. In this position the tooth of the pawl 33 is mainntained in the path of the actuating roller 39. During the setting operation the pawl member 33 is maintained in substantially vertical position by the roller 46 being disposed between the gate 45 and the spring 42, but towards the end of the setting stroke the guide pin 46 engages the bent portion 44 of the lower end of the spring 42 and puts the same under tension so that when this pin 46 passes down below the lower end of the gate 45 this spring 42 kicks the guide pin 46 and the pawl 43 over to the left and effectively closes the gap between the gate and the spring to prevent the pin 46 traversing in a backward direction its path to the right of the gate. In this position the tooth 34 of the pawl is out of the path of the actuating roller 39 and the length of the gate 45 is such as to permit the pawl to occupy this position only after the timer 27 and the switch mechanism 28 are set. The spring 42 effectively closes the gap between the lower end thereof and the lower end of the gate 45 so that the guide pin 46 is forced to traverse in the backward direction the path to the left of the gate 45. In this reverse movement of the pawl 33 due to the operation of the timer, the guide pin 46 is disposed between the spring 43 and the gate 45. In the particular embodiment shown, the spring 43 is slightly inclined towards the right throughout the main body portion thereof and near the upper end is bent to the right (Fig. 4) to form the bent portion 43' so that the free end of the spring 43 is in substantial alignment with the gate 45. In its backward stroke the guide pin 46 is forced by this spring 43 to the position shown in Fig. 4 ready for the setting operation.

Figure 5:
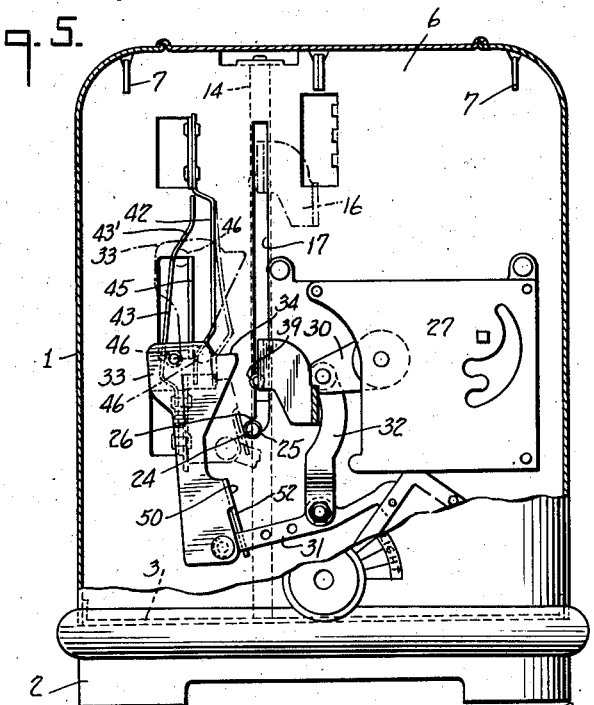
Fig. 5 is a view similar to Fig. 4 with the mechanism in a different position.

At the end of the toasting operation the pin, roller 25 is kicked out of the lower end of the slot 17 and thereby permitting the elevator or ejector spring 21 to elevate the toast rack to the uppermost position with the toast then occupying the ejected position. For this purpose the pawl member 33, which is pivotally attached to the lever 31, is provided with a right angularly formed portion 50 having a downwardly extending part 52 disposed between the lever 31 and the frame member 6. This member 52 forms a trip which engages the roller 25, as indicated in dotted lines in Fig. 5, to kick the latter out from under the shoulder 26 at the end of the toasting operation thereby permitting the ejector spring 21 to lift the elevator 20 to the toast ejected position. The spring means for causing the lever 31 to move in an upward direction about its pivot and thereby carry the pawl 33 is omitted for convenience in illustration, but it is the conventional spring means for this purpose.

The operation is as follows:

With the bread to be toasted positioned upon the racks 10 in the chambers, the user presses upon the thumb piece 15 and actuates it downwardly toward the bottom of the slot 17. With this movement of the thumb piece 15 the ejector 20 is moved downwardly against the tension of the spring 21 until the pin 24, 25 is engaged under the shoulder 26 of the lock formed at the bottom of the slot 17. This movement of the thumb piece 15 also causes the roller 39 to engage the tooth 34 of the pawl 33 with the result that the pawl 33 is actuated downwardly to carry the lever 31 to the position roughly indicated in Fig. 5. The switch mechanism 28 is thereby closed to supply electric energy to the heating elements and the timer 27 is simultaneously set to determine the period of the toasting operation. During the toasting operation the lever 30 is gradually moved upward by the time operating mechanism and this carries through the link 32 and the lever 31 the pawl 33 upwardly. During this upward movement of the pawl 33 the pawl tooth 34 is moved towards the left with respect to the slot 17 and is, therefore, out of the path of the roller 39 of the thumb piece 15, the pawl having been kicked over by the lower end of the spring 44 engaging the pin 46, this spring having been put under tension, as indicated in dot and dash lines in Fig. 5, as the pin 46 approaches the lower end of the gate 45. As the pawl moves upwardly the spring 43 moves the pawl back into the path of the roller 39, the upper end 43' of the spring being bent over to the right (Fig. 4) to effect this purpose. Upon its return to the off position indicated in Fig. 4 the pawl member 33, through the trip 52 carried thereby, engages the pin 24, 25 and moves it from underneath the holding shoulder 26, whereupon the spring 21 carries the ejector and the racks up to the toast ejected position. The pawl 33 is provided with a cam surface 49 on the upper end and on the side thereof adjacent the slot 17 and the pin 39 is adapted to engage this cam surface to move the pawl 33 out of its path against the tension of the spring 43 during the toast ejecting operation. The spring 43 returns the pawl to the operative position indicated in Fig. 4 after the member 16, together with the pin 39, have passed upwardly to the position indicated in Fig. 4.

I claim:

1. In an automatic electric toaster, a movable rack for carrying the toast, a timing and switch mechanism, means for setting said timing and switch mechanism including a pawl member and a manual operating member, said pawl member occupying a position in the path of said manual member during the setting operation, a spring member engaging said pawl and adapted to kick the same out of the path of said manual member at the end of the setting operation and a second spring adapted to engage said pawl at the end of its return stroke and force the same again into the path of the manual member.

2. In an automatic electric toaster, a movable rack for carrying the toast, a timing and switch mechanism, means for setting said timing and switch mechanism including a pawl member and a manual operating member, said pawl member occupying a position in the path of said manual member during the setting operation, a spring member engaging said pawl and adapted to kick the same out of the path of said manual member at the end of the setting operation and a second spring adapted to engage said pawl at the end of its return stroke and force the same again into the path of the manual member, a toast ejector engaging said rack, a lock for locking said ejector in the toasting position and means operated by said mechanism for unlocking said lock at the end of the toasting operation.

3. In a toaster of the character set forth in claim 1 wherein a gate is disposed between said springs and said pawl member is provided with a pin which traverses one side of the gate during the said operation and the other side of the gate during the return operation.

4. In an automatic electric toaster, a timing and switch mechanism, a toast rack and a manual device for operating the same, a frame member having a vertical slot therein for guiding said manual device, said vertical slot having a locking shoulder at the lower end thereof, an ejector for said rack having a pin following said slot and adapted to be locked underneath said shoulder when said manual device is moved downwardly, a setting member for said timing and switch mechanism having a part disposed in the path of said manual device during the setting operation, a spring engaged by said setting device near the end of the setting operation and adapted to kick said setting device out of the path of the manual device at the end of the setting operation, said setting member having a trip which engages said pin upon the return movement to release the same from said shoulder and a separate spring adapted to engage said pawl at the upper end of its return movement to move the same to the position in the path of the manual device.

5. In an automatic electric toaster, a timing and switch mechanism, a toast rack and a manual device for operating said rack, a setting member for said timing and switch mechanism having a portion thereof disposed in the path of said manual device, a gate and a leaf spring disposed generally parallel to the path of the manual device and adapted to engage therebetween a part of said setting device during the setting operation, said spring being shaped to be put under tension at the end of the setting operation to kick the engaging part of the setting device to the other side of the gate with the portion of the setting device out of the path of the manual device.

6. In a toaster of the character set forth in claim 5 including a second spring generally parallel with said gate and on the opposite side thereof from said first spring, said second spring and said gate engaging therebetween said engaging part of said setting device during the toasting operation, said second spring being bent over at one end in a direction to force said portion of said setting device into the path of the manual device at the completion of the toasting operation.

ALLAN M. YOUNG.